(12) United States Patent
Gazzolo et al.

(10) Patent No.: US 7,273,632 B2
(45) Date of Patent: Sep. 25, 2007

(54) ADDITIVE FOR INFANT MILK FORMULAS

(75) Inventors: Diego Gazzolo, Genoa (IT); Fabrizio Michetti, Via della Lupa 22, Rome (IT)

(73) Assignees: Istituto Giannina Gaslini, Genoa (IT); Fabrizio Michetti, Rome (IT)

( * ) Notice: Subject to any disclaimer, the term of this patent is extended or adjusted under 35 U.S.C. 154(b) by 538 days.

(21) Appl. No.: 10/247,633

(22) Filed: Sep. 20, 2002

(65) Prior Publication Data

US 2004/0086617 A1 May 6, 2004

(30) Foreign Application Priority Data

Sep. 21, 2001 (IT) .......................... MI2001A1969

(51) Int. Cl.
*A23C 11/00* (2006.01)
*A23C 11/06* (2006.01)
*A23C 9/00* (2006.01)

(52) U.S. Cl. ........................ 426/580; 426/656; 426/801

(58) Field of Classification Search ................ 426/580, 426/656, 801
See application file for complete search history.

*Primary Examiner*—Maryam Monshipouri
*Assistant Examiner*—Marsha Tsay
(74) *Attorney, Agent, or Firm*—Young & Thompson

(57) ABSTRACT

Disclosed is the use of the protein S100B as an infant milk formula supplement.

9 Claims, No Drawings

```
SEQUENCE LISTING

<160> NUMBER OF SEQ ID NOS: 2

<210> SEQ ID NO 1
<211> LENGTH: 18
<212> TYPE: DNA
<213> ORGANISM: Artificial Sequence
<220> FEATURE:
<223> OTHER INFORMATION: Description of Artificial Sequence: Primer

<400> SEQUENCE: 1
catttcttag aggaaatc                                                    18

<210> SEQ ID NO 2
<211> LENGTH: 18
<212> TYPE: DNA
<213> ORGANISM: Artificial Sequence
<220> FEATURE:
<223> OTHER INFORMATION: Description of Artificial Sequence: Primer

<400> SEQUENCE: 2
atgttcaaag aactcgtg                                                    18
```

ADDITIVE FOR INFANT MILK FORMULAS

This application claims priority to Italian Patent Application MI2001A001969, filed Sep. 21, 2001.

This invention relates to the use of the protein S100B as an additive for infant milk formulas.

The mother's milk is known to constitute the best nourishment for neonates and infants. However, various situations exist in which synthetic preparations have to be used; these preparations are mainly based on cow's milk, to which various ingredients typically present in human milk are added. The substances or additives generally used to supplement the artificial (or synthetic) milk formulas include proteins such as casein, lactalbumin, lactoferrin, lysozyme, peptides or individual amino-acids, antibodies, in particular immunoglobulin-A, vitamins, such as vitamins C and D, fatty acids, mineral salts and the like. The purpose of supplementation with or addition of synthetic preparations is to reproduce the qualitative and quantitative composition of human milk. For example, U.S. Pat. No. 4,303,692 describes a synthetic infant milk formula which contains taurine at levels substantially equivalent to those found in human milk. As the taurine content is considerably reduced in the manufacture of artificial infant milk formula based on cow's milk, reducing the nutritional efficacy of the formulas, the said patent recommends the addition of taurine to the synthetic milk formula so as to reproduce the concentration found in human milk. Patent WO96/26647 recommends supplementing infant milk formula with mixtures of polyunsaturated fatty acids so as to reproduce the composition of human milk and improve the visual neurological responses evoked in babies.

The substances that make up human milk include various calcium-binding proteins such as alpha-lactalbumin, calmodulin and osteocalcin (Lonnerdal B, Glazier C. Calcium binding by alpha-lactalbumin in human milk and bovine milk. J Nutr 1985;115:1209-16; Pittard W B $3^{rd}$, Goddis K M, Hollis B W. Osteocalcin and human milk. Biol Neonate 1993; 63: 61-3). Surprisingly, the authors of the present invention have discovered that a particular calcium-binding protein known as S100B is contained in human milk in concentrations much higher than those found in other biological fluids, such as blood and cerebrospinal fluid. Moreover, human milk contains mRNA for S100B.

S100B is an acid calcium-binding protein, the homodimer of two beta sub-units, which was initially isolated from nervous tissue, where it occurs in high concentrations in the glial cells, and subsequently also found in other tissues, such as adipose tissue, where it is particularly concentrated (Heizmann C W. $Ca^{2+}$-binding S100 proteins in the central nervous system. Neurochem Res 1999; 24:1097-1100; Michetti F, Dell'Anna E, Tiberio G, Cocchia D. Immunochemical and immunocytochemical study of S-100 protein in rat adipocytes. Brain Res 1983; 262: 352-6). The biological function of S100B is still uncertain, although various hypotheses have been formulated. In animal models and cell cultures it has been found that this protein can act as a cytokine with a neurotrophic effect (Heizmann C W. $Ca^{2+}$-binding S-100 proteins in the central nervous system. Neurochem Res 1999;24: 1097-1100). It is interesting to note that the way in which the protein accumulates at caudo-rostral level may be correlated with the biochemical, morphological and electrophysiological development of the human nervous system (Zuckerman J E, Herschman H R, Levine L. Appearance of a brain specific antigen (th S-100 protein) during human foetal development. J Neurochem 1970;17:247-51). The neurotrophic activity of S100B was recently confirmed by a clinical trial which demonstrated the correlation between the protein levels in the umbilical cord and physiological events associated with the maturity of the brain (Gazzolo D, Vinesi P, Marinoni E, Di Iorio R, Marras M, Lituania M, Bruschettini P, Michetti F. S100B protein concentrations in cord blood: correlations with gestational age in term and preterm deliveries. Clin Chem 2000;46: 998-1000). Equally, a body of evidence demonstrates that human milk contains substances involved in the cerebral development of neonates, including hormones, growth factors and cytokines (Gordon N. Nutrition and cognitive function. Brain Dev 1997; 19: 165-70).

It is therefore important to reproduce the S100B protein content of human milk in artificial infant milk formulas in which that protein is present in concentrations insufficient to ensure an intake sufficient for infants' brain development and growth needs due to the destructive effect of the production process This invention therefore relates to the use of protein S100B as an additive/supplement in infant milk formulas. The term "infant milk formula" means any "artificial" formula obtained by mixing milk derivatives such as proteins, sugars, mineral salts, vitamins and fats, possibly with the addition of substances of various origins such as soya protein and the like, or a "semi-artificial" formula based on milk of animal origin, such as suitably treated and supplemented cow's milk. Examples of artificial milk formulas are reported in Friend B. A. et al., Journal of Applied Nutrition, vol. 35 N. 2 (1983), pp. 88-115 and in U.S. Pat. Nos. 2,694,640, 3,542,560, 3,798,339 and 3,415,655.

The formulas in accordance with the present invention are mainly designed for neonates and infants, but can also be used by pregnant women to improve the unborn baby's brain formation and development.

These formulas may be ready for use or in concentrated, dried or powder form for dilution with water at the time of use.

In accordance with a preferred embodiment, protein S100B is added to the formula so as to obtain a final concentration (calculated at the time of use) ranging between 0.1 and 1000 µg/l, preferably between 1 and 500 µg/l, and even more preferably between 60 µg/l and 200 µg/l.

Protein S100B can be purchased (Sigma-Aldrich) or purified from bovine brain or that of another animal in the form of a mixture of isoforms S100A1 and S100B, as described by Moore (Moore B W, Biochem Biophys Res Commun 19,1965, 739-744) or Fulle et al (Fulle S, Mariggiò M A, Fanò G, Salvatore A M, Mercanti D, Petrelli C, Calissano P, Neurosci Res Commun 10, 1992, 37-43). Recombinant S100beta can be expressed in *Escherichia coli* and purified as described by Van Eldik et al (Van Eldik L J, Staecker J L, Winningham-Major F, J biol Chem 263, 1988, 7830-7837) and Barger and Van Eldik (Barger S W, Van Eldik L J J biol Chem 267, 1992, 9689-9694), and the "disulphide-linked" dimer form, considered biologically active, can be produced as described by Barger et al (Barger S W, Wolchock SR, Van Eldik L J, Biochim Biophys Acta 1160, 1992, 105-112) or Scotto et al (Scotto C, Mèly Y, Ohshima H, Garin J, Cochet C, Chambaz E, Baudier J, J biol Chem 273, 1998, 3901-3908). For the purposes of the present invention, any species variant (including the human variant) or isoform of protein S100B with activity in man can be used. The amino-acid sequence of the protein is known to be highly conserved in philogenesis, varying by less than 5% between man, ox, rat, mouse and pig (Moore B W, The S100 protein, in Marangos P J, Campbell I C, Cohen R M, eds, "Neuronal and glial proteins", Academic Press, San Diego, pp 137-167, 1984). The nucleotide sequence of the human S100B gene is also known (Allore R J, Friend W C, O'Hanlon D, Neilson K M, Baumal R, Dunn R J, Marks A, Cloning and expression of the human S100-beta gene, J Biol Chem 265:15537-15543, 1990).

EXAMPLE 1

Protein S100B was measured in milk samples donated by 16 women with consecutive single normal pregnancies 5 days after the birth, which took place between the 37th and 42nd week of gestation. Similar measurements were performed on 16 samples of different types of artificial milk routinely used in paediatric practice. The exclusion criteria were multiple pregnancies, hypertension and diabetes in pregnancy, maternal infections and fever, chromosomal anomalies, metabolic disorders, disease of the breast or central nervous system, malnutrition and heart disease.

Measurement of S100B

After collection of the milk, the samples were immediately centrifuged at 900 rpm for 10 min. and the supernatants stored at −70° C. before measurement. The concentration of protein S100B was measured in all samples using a commercial immunoluminometric assay (Liamat Sangtec 100, AB Sangtec Medical, Bromma, Sweden). The assay is specific for the beta subunit of the protein. Each measurement was conducted in duplicate, following the manufacturer's instructions, and the means were recorded. The sensitivity limit of the assay was 0.02 μg/l. The "intra-assay" precision (cv) was <5% and the "inter-assay" precision was <10%. The S100B levels in the milk are expressed as the mean ±SD.

Western Blot Analysis

The procedure described above (8) was used after electrophoresis in mini-gel of 15% polyacrylamide-SDS (w/v) using a Bio-Rad Miniprotean II apparatus (Hercules, Calif.) as described by Laemmli (1970). This procedure, which was designed especially to reduce the risk of dispersal of the protein, includes fixation with glutaraldehyde to increase protein retention on the membrane. The PAGE reagents were supplied by Bio-Rad, SDS PAGE and the molecular weight standards by Pharmacia (Uppsala, Sweden). 20 μl samples of human milk were added to the gels and transferred electrophoretically to a nitrocellulose sheet (0.45 μM) in transfer buffer (25 mM Tris, 192 mM glycine, 20% v/v methanol) using a Bio-Rad Mini-transblot apparatus. The transfer was performed at 100 W for 60 min. at 4° C. After the transfer, the nitrocellulose was washed briefly with PBS and incubated in 0.2% (v/v) glutaraldehyde in PBS for 45 min. at room temperature to increase protein retention on the nitrocellulose. The nitrocellulose was washed rapidly with PBS, and the unreacted sites were blocked with PBS containing 2% BSA (w/v), 0.1% gelatin (w/v) and 0.1% Tween 20 (v/v) for 60 min. at room temperature. After 5 washes with PBS containing 0.1% (v/v) Tween-20 (5 min. for each wash at room temperature), the sheet was incubated for 60 min. at room temperature with the primary antibody (1:2000 anti-S100B rabbit antiserum, Dako, Glostrup, Denmark) or pre-immune rabbit serum at the same protein concentration as the corresponding specific serum) in PBS containing BSA and gelatin as indicated above. The nitrocellulose sheet was washed as described above and then incubated for 60 min. at room temperature with anti-rabbit goat IgG biotinylated and purified by affinity (Vector Laboratories) diluted 1:300 in PBS containing BSA and gelatin. After 5 washes the sheet was incubated at room temperature in the dark with diaminobenzidine (Peroxidase substrate kit DAB; Vector Laboratories) to display the antibody reactivity. No immunostaining was observed with the control serums. In some experiments, and for the molecular weight standards, after fixation with glutaraldehyde the sheet was stained with 0.1% (w/v) amide black in 45% (v/v) acetic acid and destained in 90% (v/v) methanol and 2% (v/v) acetic acid to reveal the proteins transferred.

RT-PCR Analysis

RNA was extracted from 10 ml of human milk using the "micro-to-midi total purification system" (Invitrogen-Lifetechnologies). After centrifugation of the sample at 900 rpm for 10 min., the cell pellet was treated in accordance with the RNA extraction protocol indicated by the manufacturer. The RNA concentration in each sample was measured by spectrophotometry (Hewlett-Packard HP UV/VIS 8450 spectrophotometer). The RNA samples were stored at −20° C. until the RT-PCR analysis was performed. Reverse transcription (RT) was performed on 2 μg of RNA from human milk and 2 μg of RNA from human brain as positive control. The final reaction volume was 40 μl, and the enzyme used was SUPERSCRIPT II reverse transcriptase (invitrogen-Lifetechnologies); the RT conditions were in accordance with the manufacturer's protocol (50 min. at 42° C. and 15 min. at 72° C.). The cDNA was stored at a −20° C. until the PCR assay was conducted. The PCR assay was conducted on 2 μl of cDNA per sample in a final volume of 25 μl. The reaction conditions for S100B were 10 pmol for each primer, 200 μM of each dNTP, 2.5 Taq polymerase units (ampliTaq Gold DNA polymerase, Applied Biosystems), 2.2 mM Mg Cl2 and 1× PCR buffer I (Applied Biosystems).

The primers used were 5'-CATTTCTTAGAGGAAATC-3' (sense) and 5'ATGTTCAAAGAACTCGTG-3' (antisense). These primers are specific for mRNA of human S100B (Riol H, Tardy M, Rolland B, Levesque G, Ven Murthy M R, Detection of the peripheral nervous system (PNS)-type glial fibrillary acidic protein (GFAP) and its mRNA in human lymphocytes, J Neurosci Res 48:53-62, 1997). The amplification conditions were 95° C. for 9 min., followed by 43 cycles at 95° C. for 15 s and cycles at 72° C. for 30 s, followed by a final extension at 72° C. for 5 min.

As stated, the positive control for PCR was human cDNA obtained by reverse transcription from RNA extracted by the same procedure from autopsied human brain. A negative control was also used (cDNA replaced with $H_2O$) to detect contamination. The products of amplification were examined by electrophoresis (1.7% agarose stained with ethidium bromide). All samples were examined in triplicate. The expected amplicon was a 147 bp band, and was compared with pUC Mix Marker 8 (MBI Fermentas).

In order to confirm the specificity of the product of amplification, the amplicons were digested with HaeIII enzyme (MBI Fermentas), which has a single restriction site in the cDNA S100B fragment. The digested fragments were analysed in 2.5% agarose stained with ethidium bromide.

Results

At the time of sampling or discharge from hospital, all mothers presented normal clinical conditions and no evidence of disorders of the central nervous system and/or infectious disease. All the human milk samples of analysed contained measurable levels of S100B, ranging from 62 µg/l to 212 µg/l (114.6±52 mean±SD), which were significantly higher (p<0.001) than the artificial milks (24.8±19.5 µg/l). The Western Blot analysis of the milk samples conducted with an anti-S100B rabbit antiserum presented a major band that migrated with a molecular weight apparently comparable with that of S100B purified from bovine brain (under 14,400 kD). No reactivity was observed with the control rabbit serum. RT-PCR analysis produced the amplicon S100B 147 bp from both human milk RNA and human brain RNA. The PCR-positive products, digested with restriction enzyme and subjected to gel electrophoresis, showed the expected bands of 100 bp and 47 bp respectively, confirming the presence of a HaeIII restriction site in the amplified fragments.

EXAMPLE 2

The short-term neurological evaluation of 14 neonates treated with mother's milk (MM) (with a high concentration of S100B, ranging between 62 µg/l and 212 µg/l) was compared with that of 14 pre-term neonates who received artificial milk (AM) /(with a low concentration of S100B, ranging between 12 µg/l and 36 µg/l); the babies were compared for weight, gestational age at birth and incidence of neonatal respiratory difficulties.

The exclusion criteria were multiple pregnancy, maternal infection and fever, chromosomal anomalies, metabolic disorders, disorders of the breast or central nervous system, and congenital heart disease.

The neurological evaluation was conducted by a quantitative method in accordance with the NNOS test (Dijxhoorn M J, Visser G H A., Fidler V J, Touwen B C L and Huisjes H J. Apgar score, meconium and acidaemia at birth in relation to neonatal neurological morbidity in term infants. Br J Obstet Gynaecol 93:217-221, 1986) and a qualitative test in accordance with Prechtl et al. (Prechtl H F R. Assessment methods for the newborn infant: a critical evaluation. In: Stratton D, editor. Psychobiology of Human Newborn. Chichester: Wiley, 1982: 21-52).

Results

The results demonstrate that although post-natal respiratory and cardiovascular problems were almost identical in the two groups, quantitative neurological maturity (MM: 59±4 vs AM: 49±2) (p<0.05) and qualitative neurological maturity (MM normal/suspect/pathological: 11/2/1 vs AM normal/suspect/pathological: 6/3/5) was better in the groups treated with the mother's milk.

The invention claimed is:

1. An artificial milk formula comprising protein S100B in an amount that is found in human milk, and wherein said artificial milk formula is in a form selected from the group consisting of a ready for use formulation, concentrated solution, dried form, and powder form.

2. The artificial milk formula according to 1, wherein said formula is in a form that is reconstituted at the time of use.

3. amended) The artificial milk formula according to claim 1, comprising an amount of S100B in an amount ranging between 0.1 and 1000 µg/l.

4. The artificial milk formula according to 3, wherein said S100B is in an amount between 1 and 500 µg/l.

5. The artificial milk formula according to 3, wherein said S100B protein is an amount between 62 µg/l and 212 µg/l.

6. A method for enhancing the nutritional value of an artificial milk formula, comprising:

adding protein S100B to said artificial milk formula in an amount that is found in human milk.

7. The method according to claim 6, wherein said S100B is added in an amount so the final concentration of S100B ranges between 62 µg/l and 212 µg/l.

8. An artificial milk formula comprising protein S100B in an amount that is found in human milk.

9. The artificial milk formula according to claim 8, wherein said S100B is present in an amount between 62 µg/l and 212 µg/l.

* * * * *